US012315434B2

(12) United States Patent
Tung et al.

(10) Patent No.: US 12,315,434 B2
(45) Date of Patent: May 27, 2025

(54) DISPLAY

(71) Applicant: AUO Corporation, Hsin-Chu (TW)

(72) Inventors: Che-Wei Tung, Hsin-Chu (TW); Wei-Li Lin, Hsin-Chu (TW); Chin-Hao Chang, Hsin-Chu (TW); Wei-Kai Huang, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 14 days.

(21) Appl. No.: 18/396,761

(22) Filed: Dec. 27, 2023

(65) Prior Publication Data

US 2025/0014504 A1 Jan. 9, 2025

(30) Foreign Application Priority Data

Jul. 3, 2023 (TW) ................................ 112124798

(51) Int. Cl.
*G09G 3/32* (2016.01)

(52) U.S. Cl.
CPC ....... *G09G 3/32* (2013.01); *G09G 2310/0243* (2013.01); *G09G 2310/08* (2013.01); *G09G 2320/0233* (2013.01); *G09G 2330/02* (2013.01)

(58) Field of Classification Search
CPC ........................................................ G09G 3/32
USPC ........................................................ 345/213
See application file for complete search history.

(56) References Cited

U.S. PATENT DOCUMENTS

2022/0223084 A1 7/2022 Lai et al.
2023/0215377 A1* 7/2023 Han .................... G09G 3/3233 345/690
2024/0257744 A1* 8/2024 Jung .................... G09G 3/3291

FOREIGN PATENT DOCUMENTS

TW I762218 B 4/2022

* cited by examiner

*Primary Examiner* — Calvin C Ma
(74) *Attorney, Agent, or Firm* — WPAT, PC

(57) ABSTRACT

A display includes a first light emitting device. The first light emitting device includes a first switch and a second switch. The first switch is configured to adjust a first node according to a first clock signal. The second switch is configured to generate a first light emitting signal according to a first voltage signal. A control end of the second switch is coupled to the first node. The first clock signal switches between a first voltage level and a second voltage level. The first voltage signal has a third voltage level. The third voltage level is more than one of the first voltage level and the second voltage level and is less than the other one of the first voltage level and the second voltage level.

16 Claims, 8 Drawing Sheets

500

DISPLAY

CROSS-REFERENCE TO RELATED APPLICATION

This application claims priority to Taiwan Application Serial Number 112124798, filed Jul. 3, 2023, which is herein incorporated by reference in its entirety.

BACKGROUND

Technical Field

The present disclosure relates to a display technology. More particularly, the present disclosure relates to a display.

Description of Related Art

In order to improve the problem of uneven brightness (mura) of the display, the design of the picture compensation (demura) is added to the light-emitting circuit. However, the design of a single driving signal causes the transistor in the light-emitting circuit to operate in the saturation region, such that the output waveform of the light-emitting circuit is easily affected by the critical voltage of the transistor, and the problem of uneven brightness reappears with the advance of the operation time. Thus, techniques associated with the development for overcoming the problems described above are important issues in the field.

SUMMARY

The present disclosure provides a display. The display includes a first light emitting device. The first light emitting device includes a first switch and a second switch. The first switch is configured to adjust a first node according to a first clock signal. The second switch is configured to generate a first light emitting signal according to a first voltage signal. A control end of the second switch is coupled to the first node. The first clock signal switches between a first voltage level and a second voltage level. The first voltage signal has a third voltage level. The third voltage level is more than one of the first voltage level and the second voltage level and is less than the other one of the first voltage level and the second voltage level.

The present disclosure provides a display device. The display device includes a first switch, a capacitor, and a second switch. The first switch is configured to adjust a first node according to a first clock signal. The second switch is configured to generate a first light emitting signal according to a first voltage signal. A control end of the second switch is coupled to the first node. A first end of the capacitor is configured to receive a second clock signal complementary to the first clock signal. A second end of the capacitor is coupled to the first node. The first clock signal switches between a first voltage level and a second voltage level. The first voltage signal has a third voltage level. The third voltage level is more than one of the first voltage level and the second voltage level and is less than the other one of the first voltage level and the second voltage level.

It is to be understood that both the foregoing general description and the following detailed description are by examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
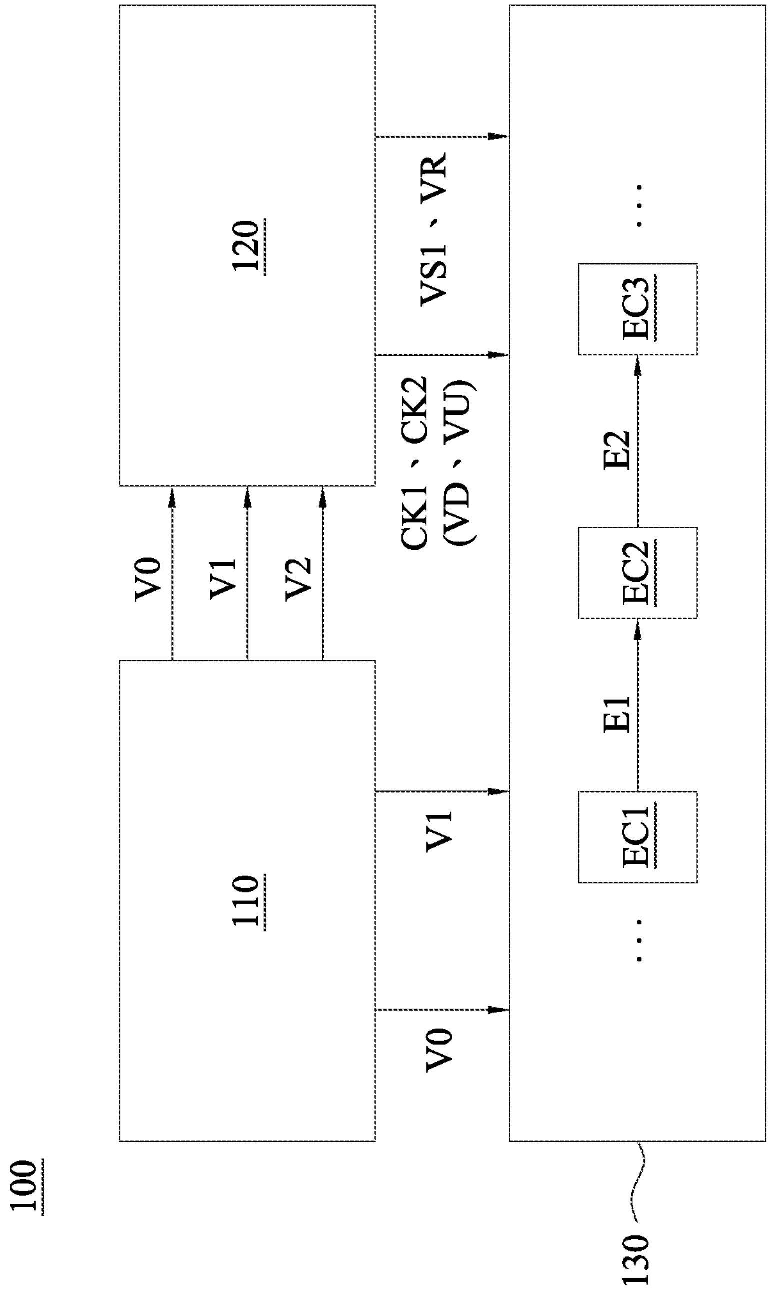
FIG. 1 is a schematic diagram of a display illustrated according to some embodiments of present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper”, “left,” “right” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The terms applied throughout the following descriptions and claims generally have their ordinary meanings clearly established in the art or in the specific context where each term is used. Those of ordinary skill in the art will appreciate that a component or process may be referred to by different names. Numerous different embodiments detailed in this specification are illustrative only, and in no way limits the scope and spirit of the disclosure or of any exemplified term.

It is worth noting that the terms such as "first" and "second" used herein to describe various elements or processes aim to distinguish one element or process from another. However, the elements, processes and the sequences thereof should not be limited by these terms. For example, a first element could be termed as a second element, and a second element could be similarly termed as a first element without departing from the scope of the present disclosure.

In the following discussion and in the claims, the terms "comprising," "including," "containing," "having," "involving," and the like are to be understood to be open-ended, that is, to be construed as including but not limited to. As used herein, instead of being mutually exclusive, the term "and/or" includes any of the associated listed items and all combinations of one or more of the associated listed items.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic diagram of a display 100 illustrated according to some embodiments of present disclosure. As shown in FIG. 1, the display 100 includes a power device 110, a level shifting device 120 and a light emitting device 130. In some embodiments, the power device 110 is configured to provide voltage signals V0-V2 to the level shifting device 120 and provide voltage signals V0-V1 to the light emitting device 130. The level shifting device 120 is configured to provide clock signals CK1 and CK2, control signals VS1 and VR to the light emitting device 130.

As shown in FIG. 1, the light emitting device 130 includes light emitting circuits EC1-EC3. In some embodiments, the light emitting circuit EC1 is configured to output a light emitting signal E1 to the light emitting circuit EC2, and the light emitting circuit EC2 is configured to output a light emitting signal E2 to the light emitting circuit EC3. In various embodiments, the light emitting device 130 may include various numbers of light emitting circuits. In some embodiments, the level shifting device 120 is further configured to provide control signals VD and VU to the light emitting device 130, and the light emitting circuits EC1 and EC2 in the light emitting device 130 is further configured to generate the light emitting signals E1 and E2 according to the control signals VD and VU.

Figure 2:
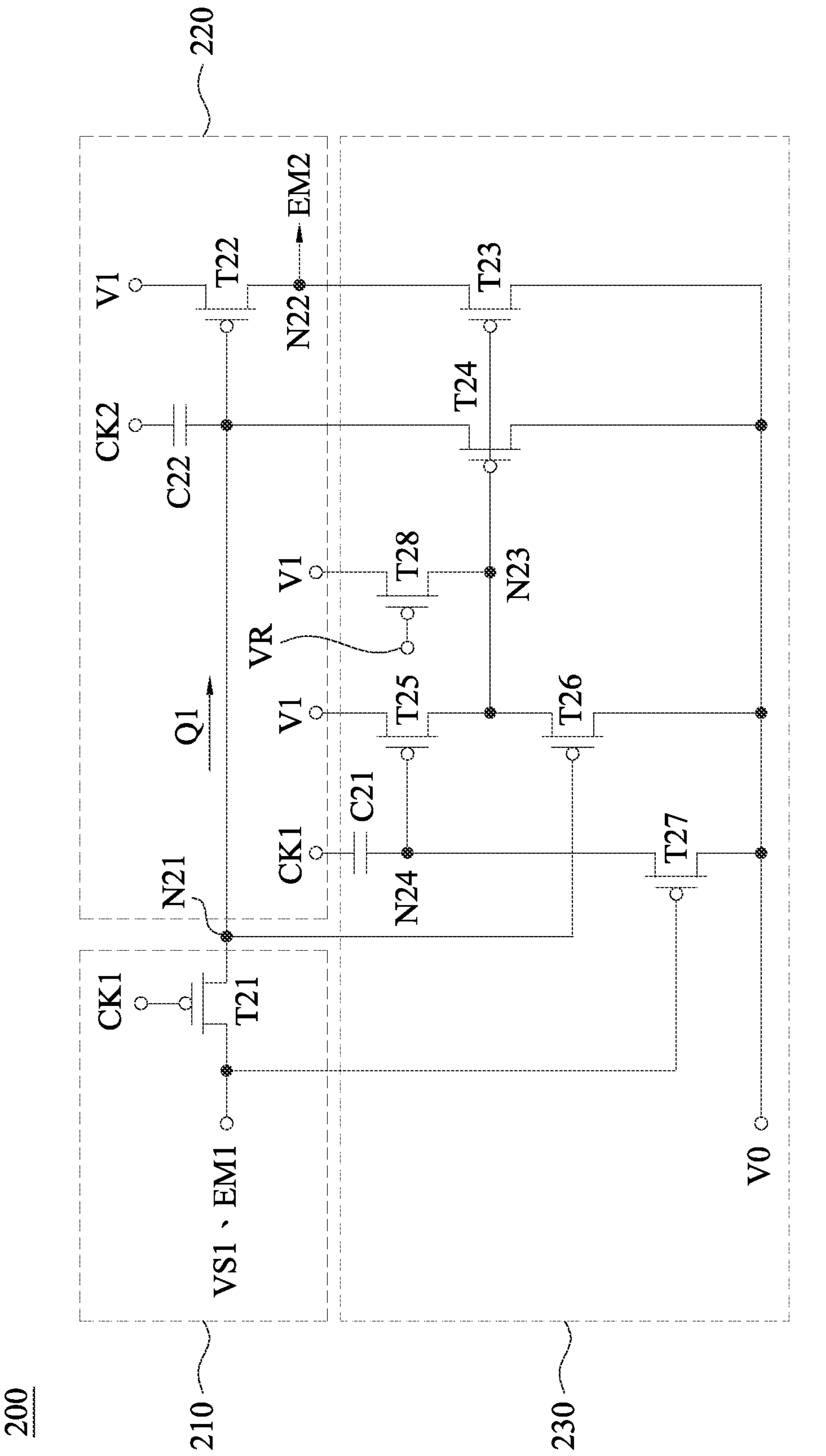
FIG. 2 is a schematic diagram of a light emitting circuit corresponding to the light emitting circuit shown in FIG. 1 illustrated according to some embodiments of present disclosure.

FIG. 2 is a schematic diagram of a light emitting circuit 200 corresponding to the light emitting circuits EC1-EC3 shown in FIG. 1 illustrated according to some embodiments of present disclosure. As shown in FIG. 2, the light emitting circuit 200 includes an enabling unit 210, a driving unit 220 and a discharging unit 230. In some embodiments, the enabling unit 210 is configured to generate a node signal Q1 according to a clock signal CK1 and one of the control signal VS1 and a light emitting signal EM1. The driving unit 220 is configured to generate a light emitting signal EM2 according to the node signal Q1 and the voltage signal V1. The discharging unit 230 is configured to discharge the driving unit 220 according to the node signal Q1, the voltage signals V0, V1, the clock signal CK1 and one of the control signal VS1 and the light emitting signal EM1. In some embodiments, the pixel circuit (not shown in the figure) in the display 100 as shown in FIG. 1 is configured to emit light according to the light emitting signals EM1 and EM2.

As shown in FIG. 2, the enabling unit 210 includes a switch T21. The driving unit 220 includes a switch T22 and a capacitor C22. The discharging unit 230 includes switches T23-T28 and a capacitor C21. In some embodiments, the switches T21-T28 can be implemented by various transistors, such as by p-type metal oxide semiconductor (PMOS) transistors.

As shown in FIG. 2, each of a first end of the switch T21 and a control end of the switch T27 is configured to receive the control signal VS1 or the light emitting signal EM1. Each of a control end of the switch T21 and a first end of the capacitor C21 is configured to receive the clock signal CK1. Each of a second end of the switch T21, a second end of the capacitor C22, a control end of the switch T22, a first end of the switch T24 and a control end of the switch T26 is coupled to a node N21. A first end of the capacitor C22 is configured to receive the clock signal CK2. A first end of each of the switches T22, T25 and T28 is configured to receive the voltage signal V1. Each of a second end of the switch T22 and a first end of the switch T23 is coupled to a node N22. A second end of each of the switches T23, T24, T26 and T27 is configured to receive the voltage signal V0. Each of a control end of each of the switches T23 and T24, a second end of each of the switches T25 and T28, and a first end of the switch T26 is coupled to a node N23. A control end of the switch T28 is configured to receive the control signal VR. Each of a control end of the switch T25, a first end of the switch T27, and a second end of the capacitor C21 is coupled to a node N24. The nodes N21 and N22 have the node signal Q1 and the light emitting signal EM2 respectively.

Referring to FIG. 2 and FIG. 1, the light emitting circuit 200 is an embodiment of the light emitting circuit EC2. In the above embodiment, the light emitting signals EM1 and EM2 correspond to the light emitting signals E1 and E2, respectively. The light emitting circuit 200 receives the light emitting signal EM1 from the light emitting circuit EC1 and provides the light emitting signal EM2 to the light emitting circuit EC3. The light emitting circuit EC3 generates a corresponding light emitting signal according to the light emitting signal EM2.

Figure 3:
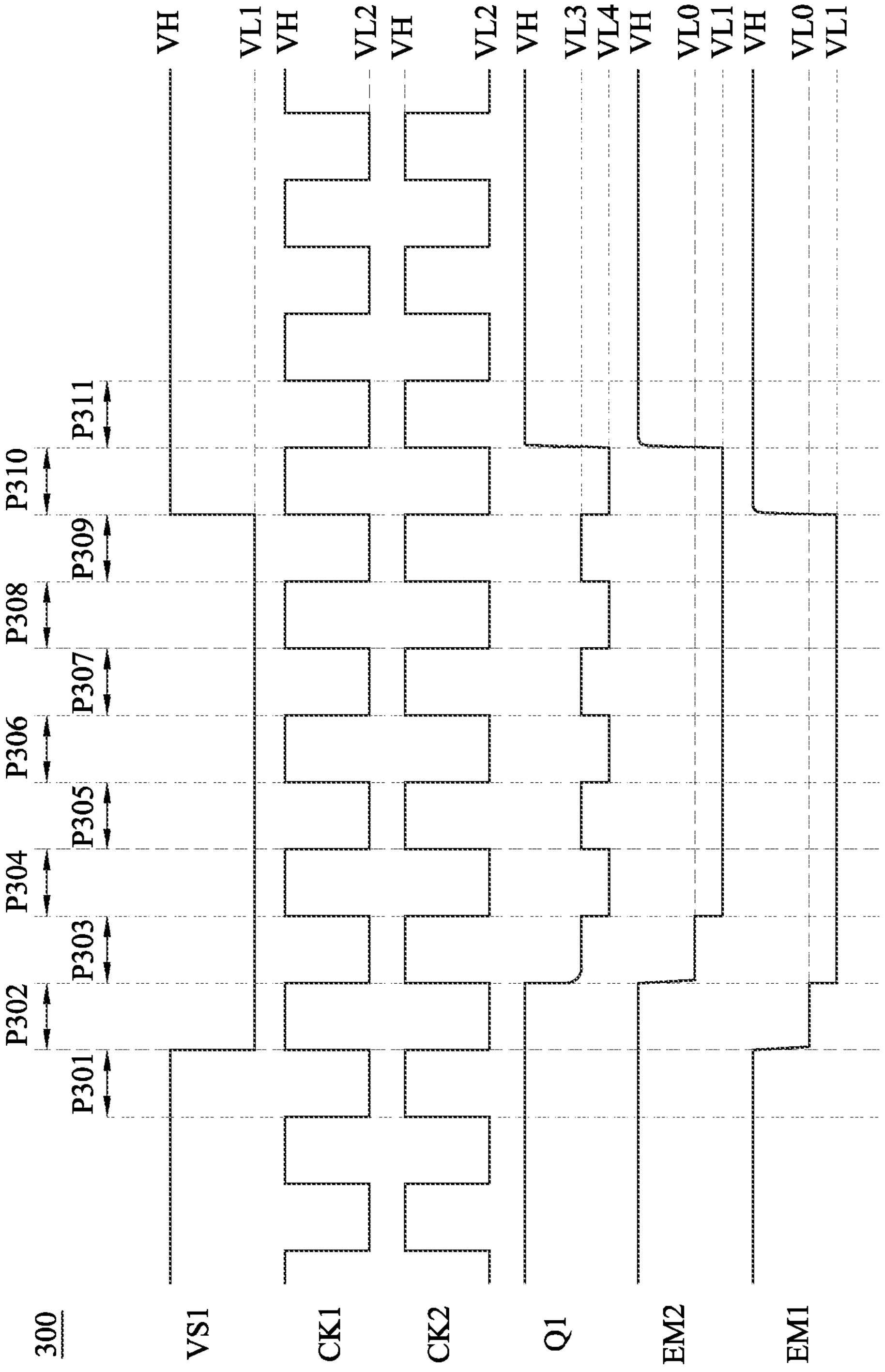
FIG. 3 is a timing diagram of operations of a light emitting circuit illustrated according to some embodiments of present disclosure.

FIG. 3 is a timing diagram 300 operations of a light emitting circuit 200 illustrated according to some embodiments of present disclosure. As shown in FIG. 3, the timing diagram 300 includes periods P301-P311 arranged continuously in order. During the periods P301-P311, the control signal VS1 operates between voltage levels VH and VL1. Each of the clock signals CK1 and CK2 operates between voltage levels VH and VL2, such as switches between the voltage levels VH and VL2 at a clock frequency. The node signal Q1 operates between voltage levels VH, VL3 and VL4. Each of the light emitting signals EM2 and EM1 operates between voltage levels VH, VL0 and VL1.

Referring to FIG. 3 and FIG. 1, in some embodiments, the voltage signal V0 has the voltage level VH. The voltage signal V1 has the voltage level VL1. The voltage signal V2 has the voltage level VL2. The voltage level VH is larger than the voltage level VL1. The voltage level VL1 is larger than the voltage level VL2. The voltage level VH is larger than the voltage level VL3. The voltage level VL3 is larger than the voltage level VL4. In some embodiments, the voltage level VL1 is larger than one of the voltage levels VL2 and the voltage level VH, and is less than the other one of the voltage levels VL2 and the voltage level VH. In some embodiments, the absolute value of the voltage difference between the voltage levels VL0 and VL1 is approximately equal to an absolute value of a transistor threshold voltage of the switch T22. The absolute value of the voltage difference between the voltage levels VL2 and VL1 is greater than or equal to an absolute value of a transistor threshold voltage of the switch T21. For example, the voltage level VH is 15 volts. The voltage level VL1 is −2.5 volts. The voltage level VL2 is −5 volts or −7 volts.

Referring to FIG. 3 and FIG. 2, in some embodiments, before the period P301, the control signal VR is maintained at the voltage level VL1, such that the switch T28 is turned on. At this time, the switch T28 provides the voltage signal V1 to the node N23 so as to reset the node N23 to the voltage level VL1, and to turn on each of the switches T23 and T24. The switch T23 outputs the voltage signal V0 to the node N22 so as to reset the node N22 to the voltage level VH. The switch T24 outputs the voltage signal V0 to the node N21 so as to reset the node N21 to the voltage level VH, such that each of the switches T22 and T26 is turned off.

During the period P301, each of the control signal VS1 and the light emitting signal EM1 is maintained at the voltage level VH, such that the switch T27 is turned off. The clock signal CK1 is maintained at the voltage level VL2, such that the switch T21 is turned on, so as to provide the control signal VS1 or the light emitting signal EM1 to the node N21. At this time, the node signal Q1 is maintained at the voltage level VH, such that each of the switches T22 and T26 is turned off. The capacitor C21 adjusts the node N24 to the voltage level VL2 through capacitive coupling, such that the switch T25 is turned on, so as to provide the voltage signal V1 to the node N23. At this time, each of the switches T23 and T24 is turned on, so as to provide the voltage signal V0 to the node N22. At this time, the light emitting signal EM2 is maintained at the voltage level VH.

During the period P302, the control signal VS1 and the light emitting signal EM1 are maintained at the voltage level VL1 and VL0, respectively, such that the switch T27 is turned on, so as to provide the voltage signal V0 to the node N24 and turn off the switch T25. The clock signal CK1 is maintained at the voltage level VH, such that the switch T21 is turned off. At this time, the node signal Q1 is still maintained at the voltage level VH, such that the switch T26 is turned off. Each of the switches T23 and T24 is still turned on, such that the light emitting signal EM2 is still maintained at the voltage level VH.

During the period P303, the light emitting signal EM1 is maintained at the voltage level VL1. The clock signal CK1 is maintained at the voltage level VL2, such that the switch T21 is turned on, so as to provide the control signal VS1 or the light emitting signal EM1 to the node N21. At this time, the node signal Q1 is maintained at the voltage level VL3, such that the switch T22 is turned on, so as to provide the voltage signal V1 to the node N22. At this time, the light emitting signal EM2 is adjusted from the voltage level VH to the voltage level VL0, such that the pixel circuit (not shown in the figure) emits light according to the light emitting signal EM2. In summary, the switch T21 is configured to adjust the node N21 according to the clock signal CK1, and the switch T22 is configured to generate the light emitting signal EM2 according to the voltage signal V1 and the node signal Q1 of the node N21.

During the period P304, the clock signal CK1 is maintained at the voltage level VH, such that the switch T21 is turned off. The clock signal CK2 is maintained at the voltage level VL2. The capacitor C22 adjusts the node N21 to the voltage level VL4 through capacitive coupling, such that the switch T22 is turned on, so as to provide the voltage signal V1 to the node N22. At this time, the light emitting signal EM2 is maintained at the voltage level VL1.

During the period P305, the clock signal CK1 is maintained at the voltage level VL2, such that the switch T21 is turned on, so as to provide the control signal VS1 or the light emitting signal EM1 to the node N21. At this time, the node signal Q1 is maintained at the voltage level VL3, such that the switch T22 is turned on, so as to provide the voltage signal V1 to the node N22. At this time, the light emitting signal EM2 is still maintained at the voltage level VL1.

The operations during each of the periods P306 and P308 of the light emitting circuit 200 is similar to the operations during the period P304, and the operations during each of the periods P307 and P309 is similar to the operations during the period P305. Therefore, some descriptions are not repeated for brevity.

During the period P310, each of the control signal VS1 and the light emitting signal EM1 is maintained at the voltage level VH. The clock signal CK1 is maintained at the voltage level VH, such that the switch T21 is turned off. The clock signal CK2 is maintained at the voltage level VL2. The capacitor C22 adjusts the node N21 to the voltage level VL4 through capacitive coupling, such that the switch T22 is turned on, so as to provide the voltage signal V1 to the node N22. At this time, the light emitting signal EM2 is still maintained at the voltage level VL1.

During the period P311, each of the control signal VS1 and the light emitting signal EM1 is maintained at the voltage level VH, such that the switch T27 is turned off. The clock signal CK1 is maintained at the voltage level VL2, such that the switch T21 is turned on, so as to provide the control signal VS1 or the light emitting signal EM1 to the node N21. At this time, the node signal Q1 is maintained at the voltage level VH, such that each of the switches T22 and T26 is turned off. The capacitor C21 adjusts the node N24 to the voltage level VL2 through capacitive coupling, such that the switch T25 is turned on, so as to provide the voltage signal V1 to the node N23. At this time, each of the switches T23 and T24 is turned on, so as to provide the voltage signal V0 to the node N22. At this time, the light emitting signal EM2 is adjusted from the voltage level VL1 to the voltage level VH.

In some approaches, in order to improve the problem of uneven brightness of the display, the design of the picture compensation is added to the light-emitting circuit. However, the design of a single driving signal causes the transistor in the light-emitting circuit to operate in the saturation region, such that the output waveform of the light-emitting circuit is easily affected by the critical voltage of the transistor, and the problem of uneven brightness reappears with the advance of the operation time.

Compared to the above approaches, in some embodiments of the present disclosure, the clock signal CK1 is maintained at the voltage level VL2 which is less than the voltage level VL1 during the period P303, and the absolute value of the voltage difference between the voltage levels VL2 and VL1 is greater than or equal to the absolute value of the threshold voltage of the switch T21, such that the switch T21 operates in the linear region, the influence on the node signal Q1 by the threshold voltage of the switch T21 is reduced. The switch T22 is configured to generate the light emitting signal EM2 according to the node signal Q1 provided by the switch T21. In this way, the switch T22 can adjust the light emitting signal EM2 to the voltage level VL0, the output waveform of the light emitting signal EM2 of the light emitting circuit 200 is less affected by the threshold voltage of the switches T21, The stability is improved, and the brightness of the display 100 is more uniform.

Referring to FIG. 1 and FIG. 2, in some embodiments, the power device 110 is configured to generate the voltage signal V2 according to the threshold voltage of the switch T21 and the voltage signal V1, so as to ensure that the absolute value of the voltage difference between the voltage signal V2 and V1 is greater than or equal to the absolute value of the threshold voltage of the switch T21, such that the level shifting device 120 can generate the clock signals CK1 and CK2 with the voltage level VL2 according to the voltage signal V2.

Figure 4:
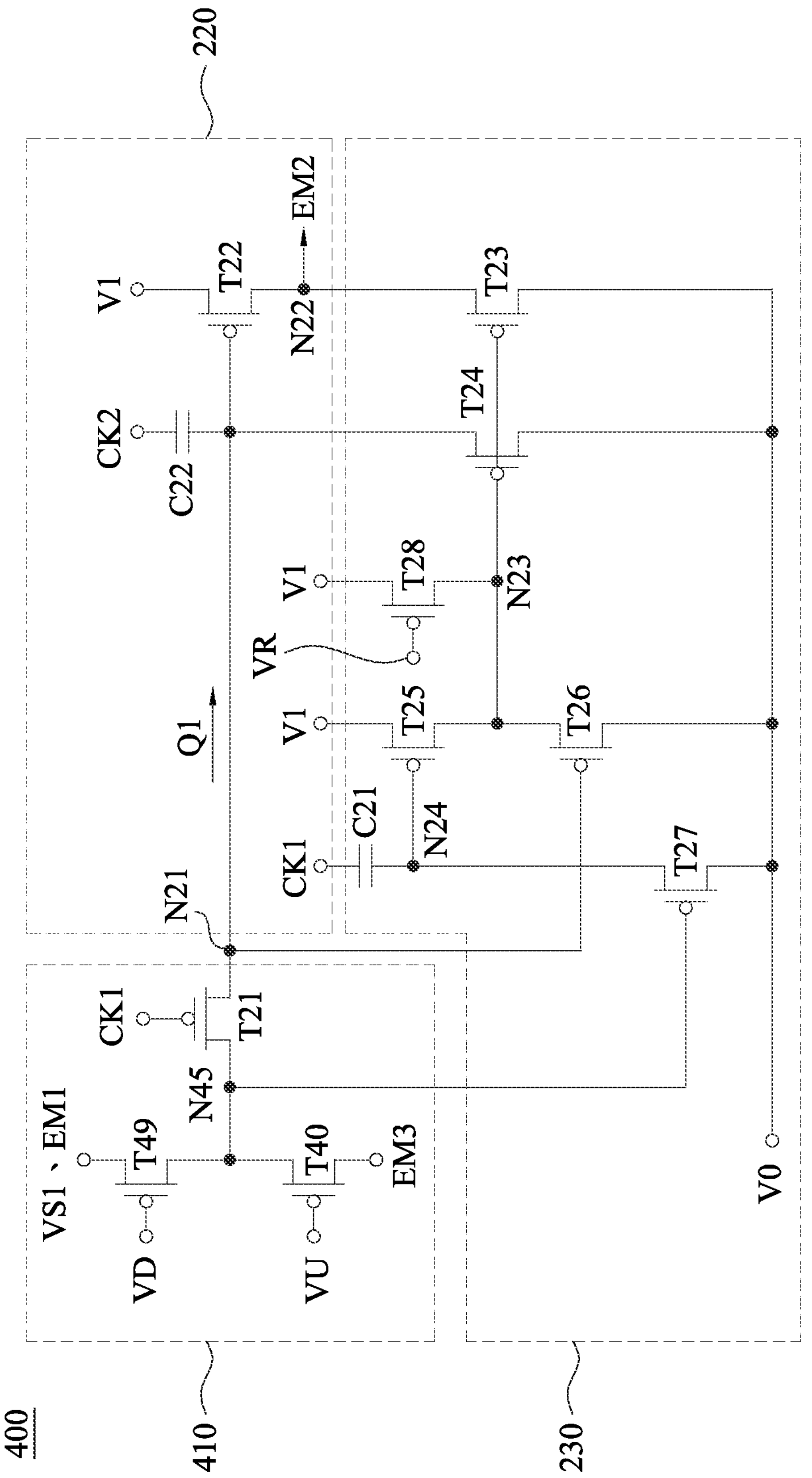
FIG. 4 is a schematic diagram of a light emitting circuit corresponding to the light emitting circuit shown in FIG. 1 illustrated according to some embodiments of present disclosure.

FIG. 4 is a schematic diagram of a light emitting circuit 400 corresponding to one of the light emitting circuits EC1-EC3 shown in FIG. 1 illustrated according to some embodiments of present disclosure. As shown in FIG. 4, the light emitting circuit 400 includes an enabling unit 410, the driving unit 220 and the discharging unit 230.

Referring to FIG. 4 and FIG. 2, the light emitting circuit 400 is an alternative embodiment of the light emitting circuit 200. FIG. 4 is labeled similarly to FIG. 2. For brevity, the following discussion will focus on the differences rather than the similarities between FIG. 4 and FIG. 2.

Compared to the light emitting circuit 200, the light emitting circuit 400 includes the enabling unit 410 instead of the enabling unit 210. In some embodiments, the enabling unit 410 is configured to control the voltage level of the node N21 according to the control signals VD and VU, the light emitting signal EM3, the clock signal CK1, and one of the control signal VS1 and the light emitting signal EM1, so as to generate the node signal Q1.

As shown in FIG. 4, the enabling unit 410 includes the switches T21, T49 and T40. Each of the first end of the switch T21, the control end of the switch T27, a second end of the switch T49 and a first end of the switch T40 is coupled to a node N45. In some embodiments, a first end of the switch T49 is configured to receive the control signal VS1 or the light emitting signal EM1. A second end of the switch T40 is configured to receive the light emitting signal EM3. A control end of the switch T49 is configured to receive the control signal VD. A control end of the switch T40 is configured to receive the control signal VU. In some embodiments, the switches T40 and T49 can be implemented by various transistors, such as by PMOS transistors.

In some embodiments, control signals VD and VU are complementary to each other. For example, when the control signal VD has the voltage level VL2, the control signal VU has the voltage level VH. At this time, the switch T40 is turned off, and the switch T49 is turned on so as to provide the control signal VS1 or the light emitting signal EM1 to the node N45. When the control signal VD has the voltage level VH, the control signal VU has the voltage level VL2. At this time, the switch T49 is turned off, and the switch T40 is turned on so as to provide the light emitting signal EM3 to the node N45.

Referring to FIG. 4 and FIG. 1, the light emitting circuit 400 is an embodiment of the light emitting circuit EC2. In the above embodiment, the light emitting signals EM1 and EM2 correspond to the light emitting signals E1 and E2, respectively. The light emitting circuit 400 receives the light emitting signal EM1 from the light emitting circuit EC1, and provides the light emitting signal EM2 to the light emitting circuit EC3. The light emitting circuit EC3 generates a corresponding light emitting signal according to the light emitting signal EM2. In other embodiments, the light emitting signals EM3 and EM2 correspond to the light emitting signals E1 and E2, respectively. The light emitting circuit 400 receives the light emitting signal EM3 from the light emitting circuit EC1, and provides the light emitting signal EM2 to the light emitting circuit EC3. The light emitting circuit EC3 generates a corresponding light emitting signal according to the light emitting signal EM2.

Figure 5:
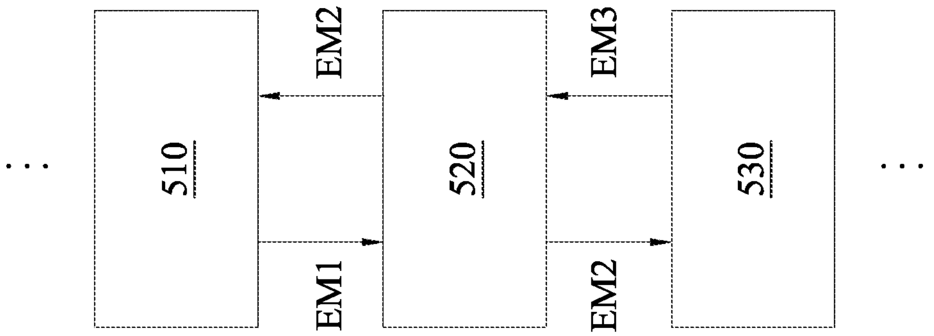
FIG. 5 is a schematic diagram of a light emitting device corresponding to the light emitting device shown in FIG. 1 illustrated according to some embodiments of present disclosure.

FIG. 5 is a schematic diagram of a light emitting device 500 corresponding to the light emitting device 130 shown in FIG. 1 illustrated according to some embodiments of present disclosure. As shown in FIG. 5, the light emitting device 500 includes light emitting circuits 510, 520 and 530. In some embodiments, the light emitting circuit 510 is configured to output the light emitting signal EM1, the light emitting circuit 520 is configured to output the light emitting signals EM2 and receive the light emitting signal EM1, and the light emitting circuit 530 is configured to receive the light emitting signal EM2. In different embodiments, the light emitting circuit 530 is configured to output the light emitting signal EM3, the light emitting circuit 520 is configured to output the light emitting signals EM2 and receive the light emitting signal EM3, and the light emitting circuit 510 is configured to receive the light emitting signal EM2. In various embodiments, the light emitting device 500 may include various numbers of light emitting circuits.

Referring to FIG. 5 and FIG. 4, in some embodiments, the light emitting circuit 520 can be implemented by the light emitting circuit 400. In the above embodiment, when the control signal VD has the voltage level VL2, the switch T49 is turned on, the light emitting circuit 510 is configured to output the light emitting signal EM1 to light emitting circuit 520, and the light emitting circuit 520 is configured to output the light emitting signal EM2 to light emitting circuit 530. When the control signal VU has the voltage level VL2, the switch T40 is turned on, the light emitting circuit 530 is configured to output the light emitting signal EM3 to light emitting circuit 520, and the light emitting circuit 520 is configured to output the light emitting signal EM2 to the light emitting circuit 510.

In summary, the light emitting circuit 400 adjusts the output direction of the light emitting signal EM2 through the control signals VD and VU. When the control signal VD has the voltage level VL2, the light emitting circuit 400 outputs the light emitting signal EM2 to light emitting circuit 530. Also, when the control signal VU has the voltage level VL2, the light emitting circuit 400 outputs the light emitting signal EM2 to the light emitting circuit 510.

Referring to FIG. 5, FIG. 4 and FIG. 1, the light emitting device 500 is an embodiment of the light emitting device 130. In one case of the above embodiment, when the control signal VD has the voltage level VL2, the light emitting signals EM1 and EM2 correspond to the light emitting signals E1 and E2, respectively, and the light emitting circuits 510, 520 and 530 correspond to the light emitting circuits EC1, EC2 and EC3, respectively. In another case of the above embodiment, when the control signal VU has the voltage level VL2, the light emitting signals EM1 and EM2 correspond to the light emitting signal E2 and E1, respectively, and the light emitting circuits 510, 520 and 530 correspond to the light emitting circuits EC3, EC2 and EC1, respectively.

Figure 6:
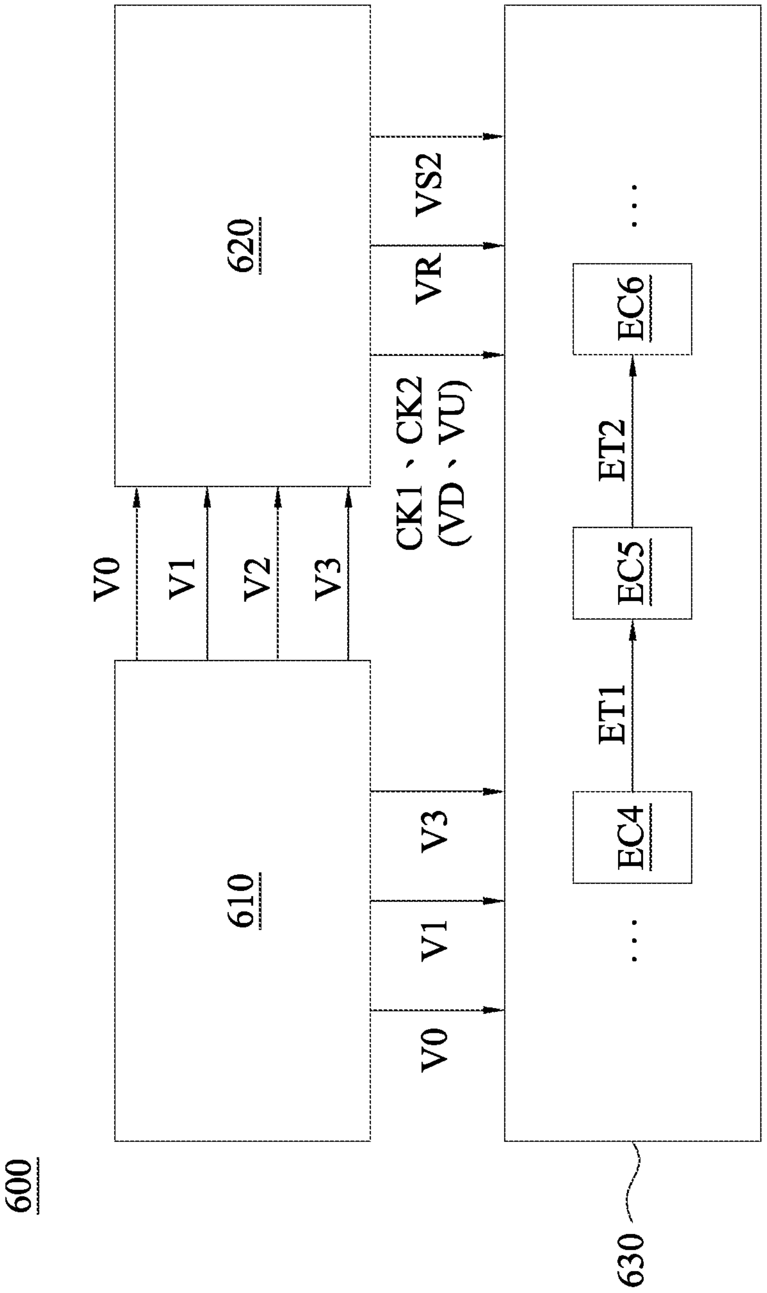
FIG. 6 is a schematic diagram of a display illustrated according to some embodiments of present disclosure.

FIG. 6 is a schematic diagram of a display 600 illustrated according to some embodiments of present disclosure. As shown in FIG. 6, the display 600 includes a power device 610, a level shifting device 620 and a light emitting device 630. In some embodiments, the power device 610 is configured to provide voltage signals V0-V3 to the level shifting device 620 and provide the voltage signals V0, V1 and V3 to the light emitting device 630. The level shifting device 620 is configured to provide the clock signals CK1, CK2, control signals VS2 and VR to the light emitting device 630.

Referring to FIG. 6 and FIG. 1, the display 600 is an alternative embodiment of the display 100. FIG. 6 is labeled similarly to FIG. 1. For brevity, the following discussion will focus on the differences rather than the similarities between FIG. 6 and FIG. 1.

As shown in FIG. 6, the light emitting device 630 includes light emitting circuits EC4-EC6. In some embodiments, the light emitting circuit EC4 is configured to output a driving signal ET1 to the light emitting circuit EC5, and the light emitting circuit EC5 is configured to output a driving signal ET2 to the light emitting circuit EC6. In various embodiments, the light emitting device 630 may include various numbers of light emitting circuits. In some embodiments, the level shifting device 620 is further configured to provide the control signals VD and VU to the light emitting device 630, and the light emitting circuits EC4 and EC5 in the light emitting device 630 generate the driving signals ET1 and ET2 according to the control signals VD and VU.

Figure 7:
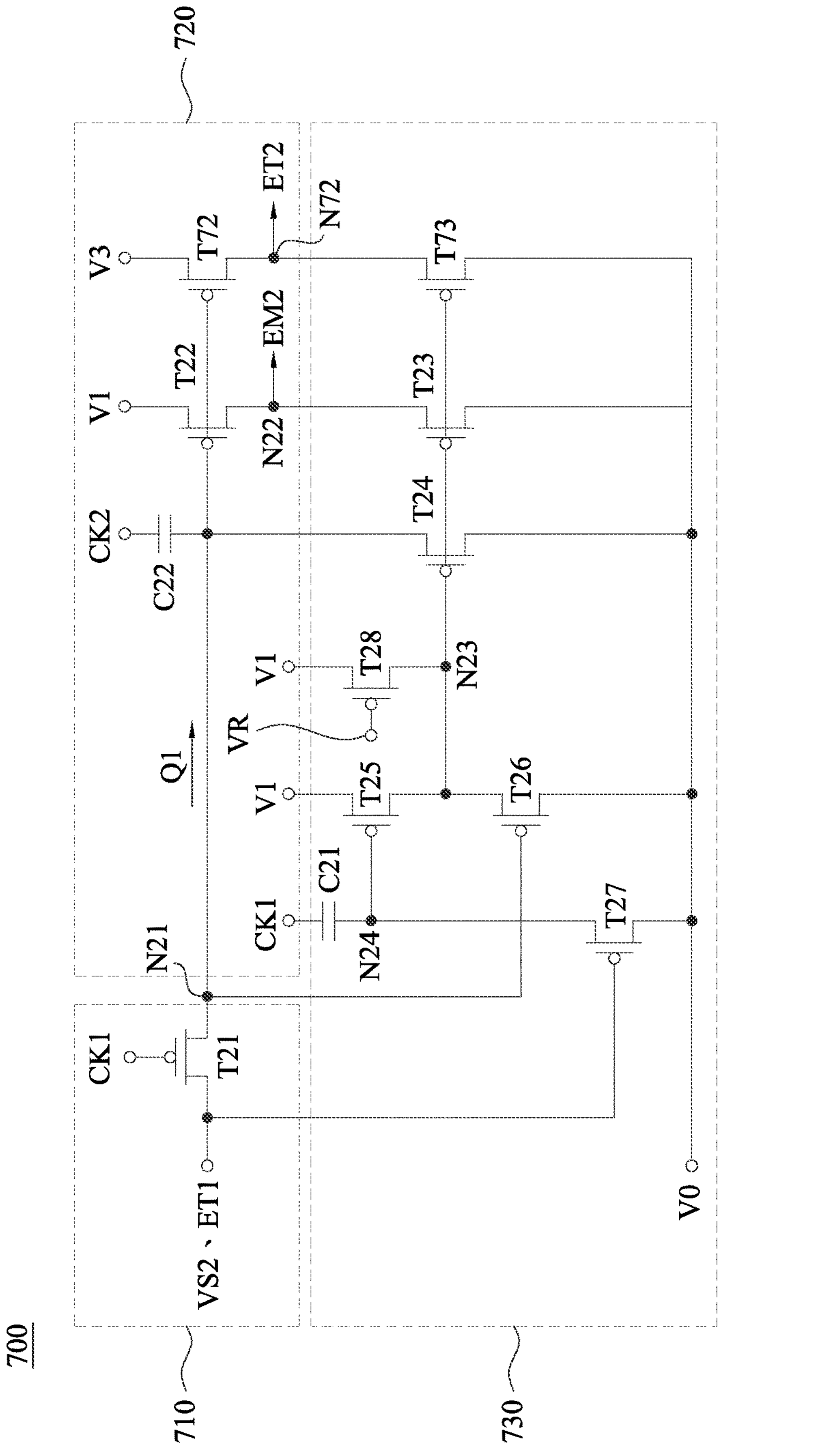
FIG. 7 is a schematic diagram of a light emitting circuit corresponding to the light emitting circuits shown in FIG. 6 illustrated according to some embodiments of present disclosure.

FIG. 7 is a schematic diagram of a light emitting circuit 700 corresponding to one of the light emitting circuits EC4-EC6 shown in FIG. 6 illustrated according to some embodiments of present disclosure. As shown in FIG. 7, the light emitting circuit 700 includes an enabling unit 710, a driving unit 720 and a discharging unit 730.

Referring to FIG. 7 and FIG. 2, the light emitting circuit 700 is an alternative embodiment of the light emitting circuit 200. FIG. 7 is labeled similarly to FIG. 2. For brevity, the following discussion will focus on the differences rather than the similarities between FIG. 7 and FIG. 2.

In some embodiments, the enabling unit 710 is configured to generate the node signal Q1 according to the clock signal CK1 and one of the control signal VS2 and the driving signal ET1. The driving unit 720 is configured to generate the light emitting signal EM2 according to the node signal Q1 and the voltage signal V1, and generate the driving signal ET2 according to the node signal Q1 and the voltage signal V3. The discharging unit 730 is configured to discharge the driving unit 720 according to the node signal Q1, the voltage signals V0, V1, the clock signal CK1, and one of the control signal VS2 and the driving signal ET1. In some embodiments, the pixel circuit (not shown in the figure) in the display 600 shown in FIG. 6 is configured to emit light according to the light emitting signal.

As shown in FIG. 7, the enabling unit 710 includes the switch T21. The driving unit 720 includes switches T22 and T72 and the capacitor C22. The discharging unit 730 includes switches T23-T28 and T73 and the capacitor C21. In some embodiments, the switches T72 and T73 can be implemented by various transistors, such as by PMOS transistors.

As shown in FIG. 7, each of the first end of the switch T21 and the control end of the switch T27 is configured to receive the control signal VS2 or the driving signal ET1. A first end of the switch T72 is configured to receive the voltage signal V3. A control end of the switch T72 is coupled to the node N21. Each of a second end of the switch T72 and a first end of the switch T73 is coupled to the node N72. A control end of the switch T73 is coupled to the node N23. A second end of the switch T73 is configured to receive the voltage signal V0.

Referring to FIG. 7 and FIG. 6, the light emitting circuit 700 is an embodiment of the light emitting circuit EC5. In the above embodiment, the light emitting circuit 700 receives the driving signal ET1 from the light emitting circuit EC4, and provides the driving signal ET2 to the light emitting circuit EC6. The light emitting circuit EC6 generates a corresponding light emitting signal and a corresponding driving signal according to the driving signal ET2.

Referring to FIG. 7 and FIG. 4, in some embodiments, the light emitting circuit 700 can also operate according to the control signals VD and VU. In the above embodiment, the light emitting circuit 700 further includes the switches T49 and T40. Each of the first end of the switch T21, the control end of the switch T27, the second end of the switch T49 and the first end of the switch T40 is coupled to each other. The first end of the switch T49 is configured to receive the control signal VS2 or the driving signal ET1. The second end of the switch T40 is configured to receive a later stage of a driving signal. The control end of the switch T49 is configured to receive the control signal VD. The control end of the switch T40 is configured to receive the control signal VU.

Figure 8:
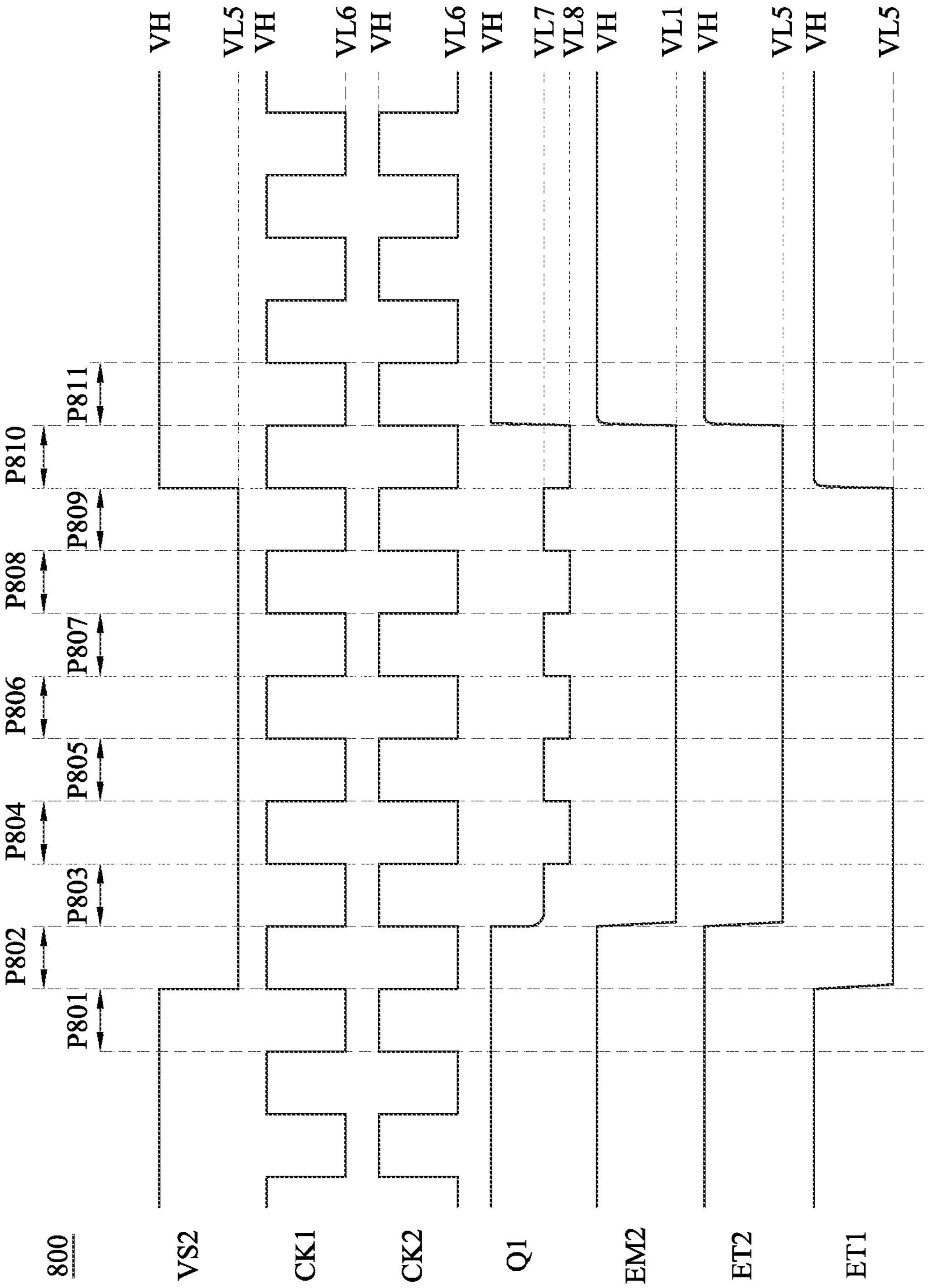
FIG. 8 is a timing diagram of operations of a light emitting circuit illustrated according to some embodiments of present disclosure.

FIG. 8 is a timing diagram 800 of operations of the light emitting circuit 700 illustrated according to some embodiments of present disclosure. As shown in FIG. 8, the timing diagram 800 includes periods P801-P811 arranged continuously in order. During the periods P801-P811, each of the control signal VS2, the driving signals ET2 and ET1 operates between voltage levels VH and VL5. Each of the clock signals CK1 and CK2 operates between voltage levels VH and VL6, such as switches between voltage levels VH and VL6 at a clock frequency. The node signal Q1 operates between voltage levels VH, VL7 and VL8. The light emitting signal EM2 operates between the voltage levels VH and VL1.

Referring to FIG. 8 and FIG. 6, in some embodiments, the voltage signal V3 has the voltage level VL5. The voltage signal V2 has the voltage level VL6. The voltage level VH is larger than the voltage level VL7. The voltage level VL7 is larger than the voltage level VL8. In some embodiments, the voltage level VL1 is larger than one of the voltage level VL5 and the voltage level VH, and is less than the other one of the voltage level VL5 and the voltage level VH. The voltage level VL5 is larger than one of the voltage level VL6 and the voltage level VL1, and is less than the other one of the voltage level VL6 and the voltage level VL1. In some embodiments, the absolute value of the voltage difference between the voltage level VL5 and VL1 is greater than or equal to the absolute value of the threshold voltage of the switch T22, and the absolute value of the voltage difference between the voltage level VL6 and VL5 is greater than or equal to the absolute value of the threshold voltage of the switch T21. For example, the voltage level VL5 is −5 volts. The voltage level VL6 is −7.5 volts.

Referring to FIG. 8 and FIG. 7, in some embodiments, before the period P801, the control signal VR is maintained at the voltage level VL1, such that the switch T28 is turned on. At this time, the switch T28 provides the voltage signal V1 to the node N23 so as to reset the node N23 to the voltage level VL1, and to turn on each of the switches T23, T24 and T73. The switches T23 and T73 output the voltage signal V0 to the nodes N22 and N72, respectively, so as to reset the nodes N22 and N72 to the voltage level VH. The switch T24 outputs the voltage signal V0 to the node N21 so as to reset the node N21 to the voltage level VH, such that each of the switches T22, T26 and T72 is turned off.

During the period P801, each of the control signal VS2 and the driving signal ET1 is maintained at the voltage level VH. The clock signal CK1 is maintained at the voltage level VL6, such that the switch T21 is turned on, so as to provide the control signal VS2 or the driving signal ET1 to the node N21. At this time, the node signal Q1 is maintained at the voltage level VH, such that each of the switches T22, T26 and T72 is turned off. The capacitor C21 adjusts the node N24 to the voltage level VL6 through capacitive coupling, such that the switch T25 is turned on, so as to provide the voltage signal V1 to the node N23. At this time, each of the switches T23, T24 and T73 is turned on, so as to provide the voltage signal V0 to each of the nodes N22 and N72. At this time, each of the light emitting signal EM2 and the driving signal ET2 is maintained at the voltage level VH.

During the period P802, each of the control signal VS2 and the driving signal ET1 is maintained at the voltage level VL5, such that the switch T27 is turned on, so as to provide the voltage signal V0 to the node N24 and turn off the switch T25. The clock signal CK1 is maintained at the voltage level VH, such that the switch T21 is turned off. At this time, the node signal Q1 is still maintained at the voltage level VH, such that the switch T26 is turned off. Each of the switches T23, T24 and T73 is still turned on, such that each of the light emitting signal EM2 and the driving signal ET2 is still maintained at the voltage level VH.

During the period P803, the clock signal CK1 is maintained at the voltage level VL6, such that the switch T21 is turned on, so as to provide the control signal VS2 or the driving signal ET1 to the node N21. At this time, the node signal Q1 is maintained at the voltage level VL7, such that the switches T22 and T72 are turned on, so as to provide the voltage signals V1 and V3 to the nodes N22 and N72, respectively. At this time, the light emitting signal EM2 is adjusted from the voltage level VH to the voltage level VL1, such that the pixel circuit (not shown in the figure) emits light according to the light emitting signal EM2, and the driving signal ET2 is adjusted from the voltage level VH to the voltage level VL5. In summary, the switch T21 is configured to adjust the node N21 according to the clock signal CK1, the switch T22 is configured to generate the light emitting signal EM2 according to the voltage signal V1 and the node signal Q1 of the node N21, and the switch T72 is configured to generate the driving signal ET2 according to the voltage signal V3 and the node signal Q1 of the node N21.

During the period P804, the clock signal CK1 is maintained at the voltage level VH, such that the switch T21 is turned off. The clock signal CK2 is maintained at the voltage level VL6. The capacitor C22 adjusts the node N21 to the voltage level VL8 through capacitive coupling, such that the switches T22 and T72 are turned on, so as to provide the voltage signals V1 and V3 to the nodes N22 and N72, respectively. At this time, the light emitting signal EM2 is still maintained at the voltage level VL1, and the driving signal ET2 is still maintained at the voltage level VL5.

During the period P805, the clock signal CK1 is maintained at the voltage level VL6, such that the switch T21 is turned on, so as to provide the control signal VS2 or the driving signal ET1 to the node N21. At this time, the node signal Q1 is maintained at the voltage level VL7, such that the switches T22 and T72 are turned on, so as to provide the voltage signals V1 and V3 to the nodes N22 and N72, respectively. At this time, the light emitting signal EM2 is still maintained at the voltage level VL1, and the driving signal ET2 is still maintained at the voltage level VL5.

The operations during each of the periods P806 and P808 of the light emitting circuit 700 is similar to the operations during the period P804, and the operations during each of the periods P807 and P809 is similar to the operations during the period P805. Therefore, some descriptions are not repeated for brevity.

During the period P810, each of the control signal VS2 and the driving signal ET1 is maintained at the voltage level VH. The clock signal CK1 is maintained at the voltage level VH, such that the switch T21 is turned off. The clock signal CK2 is maintained at the voltage level VL6. The capacitor C22 adjusts the node N21 to the voltage level VL8 through capacitive coupling, such that the switches T22 and T72 are turned on, so as to provide the voltage signals V1 and V3 to the nodes N22 and N72, respectively. At this time, the light emitting signal EM2 is still maintained at the voltage level VL1, and the driving signal ET2 is still maintained at the voltage level VL5.

During the period P811, each of the control signal VS2 and the driving signal ET1 is maintained at the voltage level VH. The clock signal CK1 is maintained at the voltage level VL6, such that the switch T21 is turned on, so as to provide the control signal VS2 or the driving signal ET1 to the node N21. At this time, the node signal Q1 is maintained at the voltage level VH, such that each of the switches T22, T26 and T72 is turned off. The capacitor C21 adjusts the node N24 to the voltage level VL2 through capacitive coupling, such that the switch T25 is turned on, so as to provide the voltage signal V1 to the node N23. At this time, each of the switches T23, T24 and T73 is turned on, so as to provide the voltage signal V0 to each of the nodes N22 and N72. At this time, the light emitting signal EM2 is adjusted from the voltage level VL1 to the voltage level VH, and the driving signal ET2 is adjusted from the voltage level VL5 to the voltage level VH.

In summary, in the embodiments shown in FIG. 6 to FIG. 8, the clock signal CK1 is maintained at the voltage level VL6 which is less than the voltage level VL5 during the period P803, and the absolute value of the voltage difference between the voltage level VL5 and VL6 is greater than or equal to the absolute value of the threshold voltage of the switch T21, such that the switch T21 operates in the linear region. The node signal Q1 is maintained at the voltage level VL7 which is less than the voltage level VL1 during the period P803, and the absolute value of the voltage difference between the voltage level VL5 and VL1 is greater than or equal to the absolute value of the threshold voltage of the switch T22, such that the switch T22 operates in the linear region and generates the light emitting signal EM2 according to the voltage signal V1. In this way, the output waveform of the light emitting signal EM2 of the light emitting circuit 700 is not affected by the threshold voltage of the transistor, the stability is improved, and the brightness of the display 600 is more uniform.

In some embodiments, the switches of each of the light emitting circuits 200, 400 and 700 can also be implemented by NMOS transistors. In the above embodiments, the relationship between the magnitude of the voltage levels is opposite of that implemented by the PMOS transistors.

For example, the voltage level VH is less than the voltage level VL1. The voltage level VL0 is less than the voltage level VL1. The voltage level VL1 is less than the voltage level VL2. The voltage level VH is less than the voltage level VL3. The voltage level VL3 is less than the voltage level VL4. The voltage level VL1 is less than the voltage level VL5. The voltage level VL5 is less than the voltage level VL6. The voltage level VH is less than the voltage level VL7. The voltage level VL7 is less than the voltage level VL8.

Referring to FIG. 6 and FIG. 7, in some embodiments, the power device 610 is configured to generate the voltage signal V3 according to the threshold voltage of the switch T22 and the voltage signal V1, so as to ensure that the absolute value of the voltage difference between the voltage signal V3 and V1 is greater than or equal to the absolute value of the threshold voltage of the switch T22, such that the level shifting device 620 can generate the control signal VS2 with the voltage level VL5 according to the voltage signal V3. In some embodiments, the power device 610 is further configured to generate the voltage signal V2 according to the threshold voltage of the switch T21 and the voltage signal V3, so as to ensure that the absolute value of the voltage difference between the voltage signals V2 and V3 is greater than or equal to the absolute value of the threshold voltage of the switch T21, such that the level shifting device 620 can generate the clock signals CK1 and CK2 with the voltage level VL6 according to the voltage signal V2.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of present disclosure provided they fall within the scope of the following claims.

What is claimed is:

1. A display, comprising:

a first light emitting device, comprising:

a first switch configured to adjust a first node according to a first clock signal; and a second switch configured to generate a first light emitting signal according to a first voltage signal, and a control end of the second switch is coupled to the first node, wherein the first clock signal switches between a first voltage level and a second voltage level, the first voltage signal has a third voltage level, and the third voltage level is more than one of the first voltage level and the second voltage level and is less than the other one of the first voltage level and the second voltage level, wherein an absolute value of a voltage difference between the second voltage level and the third voltage level is greater than or equal to a threshold voltage of the first switch.

2. The display of claim 1, further comprising:

a third switch coupled to the first switch, a control end of the third switch is configured to receive a first control signal; and a fourth switch coupled to the first switch, a control end of the fourth switch is configured to receive a second control signal, wherein the first control signal and the second control signal are complementary to each other.

3. The display of claim 2, wherein when one of the first control signal and the second control signal has the first voltage level, the other one of the first control signal and the second control signal has the second voltage level.

4. The display of claim 1, further comprising:

a third switch configured to generate a first driving signal according to a second voltage signal, a control end of the third switch is coupled to the first node, wherein the second voltage signal has a fourth voltage level, and the fourth voltage level is larger than one of the second voltage level and the third voltage level and is less than the other one of the second voltage level and the third voltage level.

5. The display of claim 4, wherein an absolute value of a voltage difference between the fourth voltage level and the third voltage level is greater than or equal to a threshold voltage of the second switch.

6. The display of claim 5, wherein an absolute value of a voltage difference between the fourth voltage level and the second voltage level is greater than or equal to a threshold voltage of the first switch.

7. The display of claim 4, further comprising:

a fourth switch coupled to the first switch, a control end of the fourth switch is configured to receive a first control signal; and a fifth switch coupled to the first switch, a control end of the fifth switch is configured to receive a second control signal, wherein the first control signal and the second control signal are complementary to each other.

8. The display of claim 7, wherein when one of the first control signal and the second control signal has the first voltage level, the other one of the first control signal and the second control signal has the second voltage level.

9. A display device, comprising:

a first switch configured to adjust a first node according to a first clock signal;

a capacitor; and a second switch configured to generate a first light emitting signal according to a first voltage signal, and a control end of the second switch is coupled to the first node, wherein a first end of the capacitor is configured to receive a second clock signal complementary to the first clock signal, a second end of the capacitor is coupled to the first node, the first clock signal switches between a first voltage level and a second voltage level, the first voltage signal has a third voltage level, and the third voltage level is more than one of the first voltage level and the second voltage level and is less than the other one of the first voltage level and the second voltage level, wherein an absolute value of a voltage difference between the second voltage level and the third voltage level is greater than or equal to a threshold voltage of the first switch.

10. The display device of claim 9, further comprising:

a third switch coupled to the first switch, a control end of the third switch is configured to receive a first control signal; and a fourth switch coupled to the first switch, a control end of the fourth switch is configured to receive a second control signal, wherein the first control signal and the second control signal are complementary to each other.

11. The display device of claim 10, wherein when one of the first control signal and the second control signal has the first voltage level, the other one of the first control signal and the second control signal has the second voltage level.

12. The display device of claim 9, further comprising:

a third switch configured to generate a first driving signal according to a second voltage signal, a control end of the third switch is coupled to the first node, wherein the second voltage signal has a fourth voltage level, and the fourth voltage level is larger than one of the second voltage level and the third voltage level and is less than the other one of the second voltage level and the third voltage level.

13. The display device of claim 12, wherein an absolute value of a voltage difference between the fourth voltage level and the third voltage level is greater than or equal to a threshold voltage of the second switch.

14. The display device of claim 13, wherein an absolute value of a voltage difference between the fourth voltage level and the second voltage level is greater than or equal to a threshold voltage of the first switch.

15. The display device of claim 12, further comprising:

a fourth switch coupled to the first switch, a control end of the fourth switch is configured to receive a first control signal; and a fifth switch coupled to the first switch, a control end of the fifth switch is configured to receive a second control signal, wherein the first control signal and the second control signal are complementary to each other.

16. The display device of claim 15, wherein when one of the first control signal and the second control signal has the first voltage level, the other one of the first control signal and the second control signal has the second voltage level.

* * * * *